H. R. EVANS, DEC'D.
A. K. EVANS, EXECUTRIX,
APPARATUS FOR PRINTING MOTION PICTURE FILMS.
APPLICATION FILED JUNE 1, 1915. RENEWED JAN. 7, 1922.
1,425,461.
Patented Aug. 8, 1922.
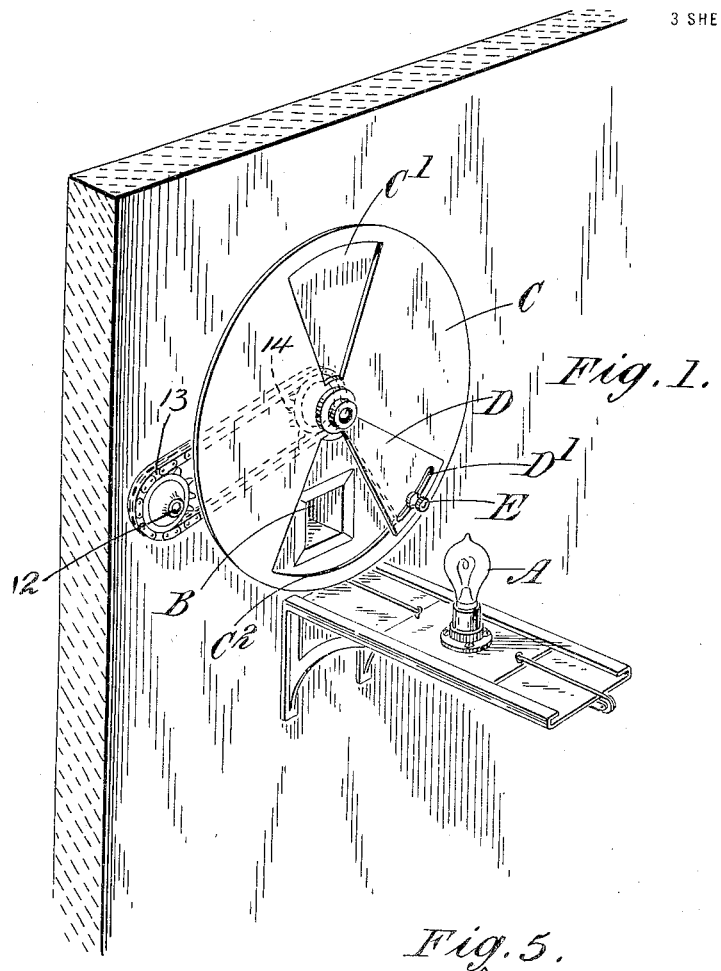
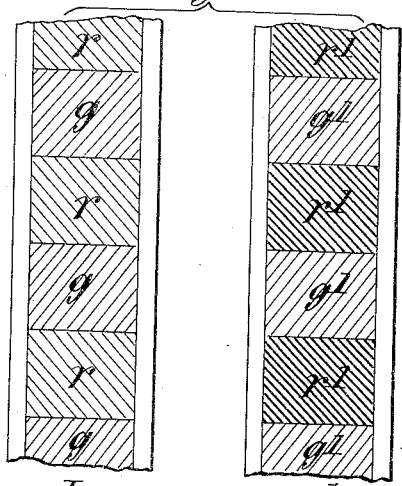

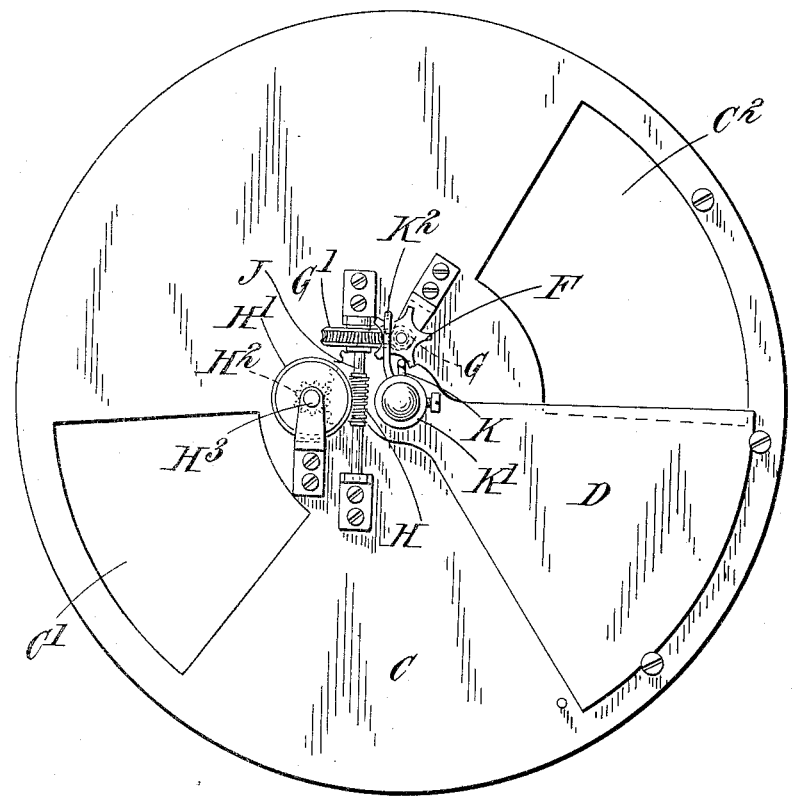
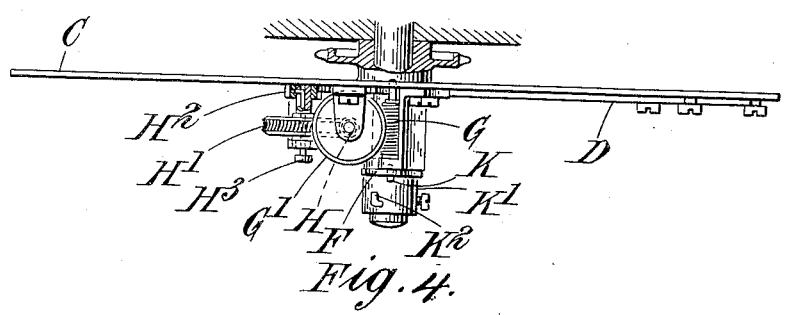

UNITED STATES PATENT OFFICE.

HENRY RIEGEL EVANS, OF LONDON, ENGLAND; ADELE KEAN EVANS EXECUTRIX OF SAID HENRY RIEGEL EVANS, DECEASED.

APPARATUS FOR PRINTING MOTION-PICTURE FILMS.

1,425,461. Specification of Letters Patent. Patented Aug. 8, 1922.

Application filed June 1, 1915, Serial No. 31,331. Renewed January 7, 1922. Serial No. 527,800.

*To all whom it may concern:*

Be it known that I, HENRY RIEGEL EVANS, a citizen of the United States of America, residing at London, England, formerly of New York, United States of America, have invented certain new and useful Improvements in Apparatus for Printing Motion-Picture Films, of which the following is a specification.

This invention relates to the formation of pictures upon a motion-picture film or the like of the kind intended to give a coloured effect by employing light of one colour with one picture and light of another colour with another picture, and blending the results so obtained to give the desired effect. Films of this kind are sometimes prepared for use with two colours only, in which the pictures are illuminated alternately with red and green lights, and the two coloured effects blended on the screen or in the eye of the observer. More than two colours may, however, be employed if desired and are then employed in a recurring cycle of changes.

An object of this invention is to provide apparatus for preparing the films for the projection of coloured motion-pictures to obtain a colour effect better than, or different from, that which would have been obtained had the films been prepared in the usual manner.

According to the present invention there is provided apparatus for the preparation of pictures of the kind described, by the use of which the density-relation between pictures to be used in co-operation with one another but for different colours, is made to be different from the density-relation that would have been obtained in the ordinary way from or in the corresponding primary photographs. The object of making this different is to make the relative proportions of the colours seen in the ultimate result different from what they would otherwise be i. e. different from the density-relation which would ensue if the present invention did not intervene to bring about an intentional modification of the ratio. It may be desired, for example, to accentuate one colour more than was the case with the original object represented, or it may be desired to correct a want of sensitivity in the photographic film to that particular colour, in which case the density of the positive pictures for this colour will be made less in relation to the other pictures than it otherwise would have been.

According to the present preferred form of apparatus embodying my invention, pictures to be used for one colour are photo-printed with a beam of light the printing effect of which is different from that employed for those to be used for another colour, the two effects having a chosen ratio; the pictures for the different colours are for some methods of exhibition arranged on different films but this process is applicable as hereinafter described whether the pictures are so arranged or whether those for different colours are upon the same film. Apparatus arranged to vary the printing effect of the light preferably does so automatically in a recurring cycle and may further be arranged or constructed so as automatically to change the relation between the different printing effect employed.

By way of illustration a construction of apparatus for two-colour work is hereinafter described with reference to the accompanying drawings in which—

Figure 1 is perspective view showing the arrangement of light and obturator disc for printing;

Figure 3 is an elevation of a modified obturator disk;

Figure 4 is a plan, partly in section, of the apparatus of Figure 3; and

Figure 5 is an explanatory diagram.

Figure 2:
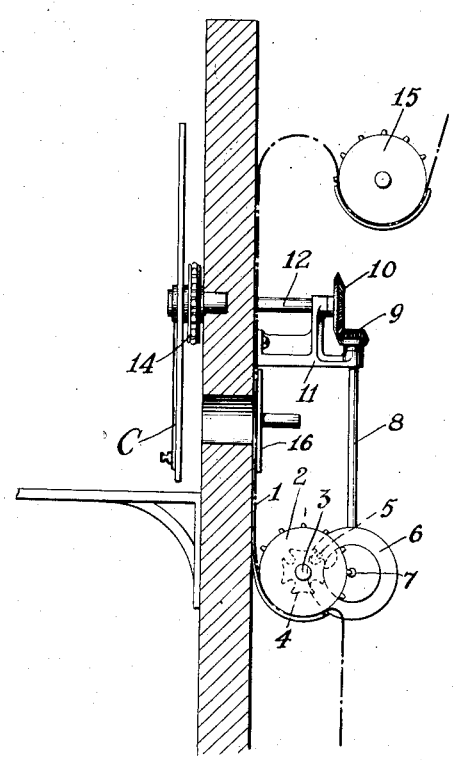
Figure 2 is a side elevation, partly in section and with certain parts broken away, showing the film-feeding mechanism.

The apparatus shown in Figure 1 includes a source of light A, a window B through which the light from A passes to printing apparatus of a well-known kind for printing kinematograph films, and an obturator disc C interposed between the source of light A and the window B. The apparatus illustrated is arranged for printing a film for two-colour work.

The obturator disc is so geared to the printing apparatus as shown in Figure 2 that it makes one complete revolution for every two pictures on the film moved past the window. The printing apparatus is constructed in the well-known manner to allow each picture to be stationary opposite the window at the time when an opening in the obturator disc allows light to reach the window B, and consists of the well known intermittently-operated feed sprocket 2 engaging the film 1 to move it step by step past the window, the sprocket 2 being mounted on a shaft 3 with a star or Geneva wheel 4 operated by the pin 5 carried in disk 6 which in turn is mounted on shaft 7; the star wheel, pin and disk constituting the well known Geneva movement. The shaft 7 is in turn driven by vertical shaft 8 through bevel pinions at the rear of disk 6 (not shown), and shaft 8 in turn is driven through bevel pinions 9 and 10 supported by bracket 11 and having a 2:1 ratio, so that shaft 8 will be driven twice as fast as shaft 12 to insure the movement of two pictures past the window for each revolution of the obturator disk C as mentioned, and as is well understood in the art. Shaft 12 carries at its front end (Fig. 1) the sprocket 13 which is geared as shown to sprocket 14 on the shaft of the obturator disk, so that the obturator disk and the film-moving mechanism are geared together to operate in the manner described. Shaft 12 may be driven in any suitable manner such for example as by a bevel gear (not shown) meshing with gear 10, as is well understood in the art. If desired, a suitable loop-forming sprocket 15 may also be provided, as is customary, above the gate as shown, and this in turn may be driven from the same source of power that drives the shaft 12, as is well understood in the art. 16 shows diagrammatically the usual film clamp at the gate, which may be operated in any well known manner, from the same source of power that drives shaft 12 and sprocket 15, as is well understood in the art.

The above described film-feeding mechanism of Fig. 2 is one of the well known standard types of film feed, and I make no claim to the same. The apparatus illustrated in these figures is arranged for two-colour work and the disc C has two openings in it $C^1$ and $C^2$ one of which, $C^2$, has a larger effective area than the other. In consequence of the difference of effective areas in $C^1$ and $C^2$ the pictures for one colour, namely, those printed by the light admitted by the aperture $C^1$, receive light of less duration and are less densely printed than those for the other colour for which light is transmitted for a period of longer duration through the aperture $C^2$. If for example it is desired to somewhat accentuate the proportion of red in the final result obtained when the pictures are projected, the positive pictures to be projected through a red colour filter may be exposed through the aperture $C^1$ so that being less dense than those exposed through $C^2$ they will allow more light to pass than those will.

Preferably one of the apertures, for example the aperture $C^2$ in the obturator disc, is adjustable. One construction to provide for this is that shown in Figure 1 where an adjustable leaf D is movable about the axis of rotation of the disc to close the aperture $C^2$ to any desired amount; the leaf D is secured in the adjusted position by a milled nut E on a screwed pin engaging with a slot $D^1$ in the leaf.

Where it is desired to produce a gradual change in the relative strengths of the component colours, a portion of the obturator may be constructed as shown in Figures 3 and 4. In this construction leaf D is automatically shifted every revolution by means of a star wheel F whose fingers strike a pin K as the disc rotates. The star wheel F is mounted on the end of a worm G gearing with a worm wheel $G^1$ and this again is mounted on a worm H gearing with a worm wheel $H^1$; on the spindle of the worm wheel $H^1$ is secured a pinion $H^2$ engaging with a toothed segment rack J secured to the leaf D.

The pin K is preferably displaceably mounted and for this purpose may be supported in the manner illustrated, that is by being mounted upon a sleeve $K^1$. By this means the change in effective value of the aperture $C^2$ may be made to commence or stop at any desired moment without stopping the rotation of the obturator merely by the operation of sliding the pin into and out of the position in which it engages with the star wheel.

In order to provide for reverse movement of the leaf D a second pin $K^2$ is preferably provided on the sleeve $K^1$. A gap is left between the pins K and $K^2$ sufficiently wide to clear the star wheel F so that when the sleeve $K^1$ is in the midway position the wheel F is not operated.

In order to provide for quick setting by hand of the leaf D the pinion $H^2$ is slidably mounted upon its spindle and can be displaced axially by pulling the knob $H^3$. When thus axially displaced the pinion no longer engages with the rack J and the leaf D may then be readily set by hand.

The source of light A is preferably slidably adjustable towards and away from the window B in a well-known manner to give the desired printing strength.

Figure 5 serves to illustrate diagrammatically the result obtained by the aid of this invention. In this diagram L indicates a strip of kinematograph film with pictures taken alternately through red and green screens, the pictures being denoted in the diagram by the areas marked $r$ and $g$ respectively. For the purpose of this exemplification these pictures $r$, $g$ constitute what are herein referred to as the primary photographs. The relative densities of these two sets of pictures are indicated by the shading as being substantially equal. At $L^1$ is indicated a strip of film printed from the strip L in which the areas $r^1$ and $g^1$ correspond with those at $r$ and $g$ respectively, but by reason of the process employed the density-relation between $r^1$ and $g^1$ is different from that between $r$ and $g$.

It is to be understood that the apparatus hereinbefore described in detail is given by way of example and that this invention is not limited in its scope to such details. It will also be understood that the expression "primary photographs" hereinbefore employed must be interpreted as including the images which would have been developed upon the negative had they all been treated alike and not subjected to the process which is the object of the present invention.

Moreover the apparatus may obviously be modified without the exercise of inventive skill so as to be suitable for three-colour work or for more than three-colour work.

It will be obvious to those skilled in the art, after understanding my invention, that various changes in and modifications of the apparatus herein shown and described may be made without departing from the spirit and scope of the invention, and I aim in the appended claims to cover all such changes and modifications as are within the spirit and scope of the invention.

In view of the various embodiments that my invention may take, I do not wish to be understood as limiting myself to the particular method and apparatus shown, nor otherwise than as indicated in the appended claims.

What I claim as my invention and desire to secure by Letters Patent is:—

1. In printing apparatus for motion pictures, the combination of an exposure window, means for moving past said window a film having different sets of pictures thereon to be reproduced in colors, a source of light the rays from which are directed upon said window, and means for so varying the printing effect of the light falling upon said window that it passes through a periodically recurring cycle of changes which synchronize with the changes of the pictures of the different sets appearing at the window.

2. In printing apparatus for motion pictures, the combination of an exposure window, means for moving past the window a film having different sets of pictures thereon to be reproduced in colors, a source of light the rays from which are directed upon said window, a device for reducing the printing effect of the light falling upon said film, and means for moving said device into the light beam being directed through said window in a periodically recurring cycle of changes which synchronize with the changes of the pictures of the different sets appearing at the window.

3. In printing apparatus for motion pictures, the combination of an exposure window, means for moving past the window a film having different sets of pictures thereon to be reproduced in colors, a source of light the rays from which are directed upon said window, a device for varying the printing effect of the light falling upon said film, means for moving said device into the light beam being directed through said window in a periodically recurring cycle of changes which synchronize with the changes of the pictures of the different sets appearing at the window, and means co-operating with said light-varying means for automatically varying the effect of said light-varying device upon the film as the printing operation proceeds.

4. In printing apparatus for motion pictures, the combination of an exposure window past which a film having different sets of pictures thereon to be reproduced in colors is moved step by step, a source of light the rays of which are directed upon said window, a shutter having a plurality of openings therein, means for rotating the shutter so that a certain one of said openings appears in register with the window synchronously with the pictures of one of said sets while another shutter opening appears synchronously with the pictures of another set, one of said openings being of greater light-transmitting capacity than the other and having means for varying its light-transmitting capacity, for the purpose specified.

5. In printing apparatus for motion pictures, the combination of means for feeding a sensitized film and a film having a series of pictures thereon past a printing light, a shutter interposed between the source of light and the films, said shutter having a plurality of openings for exposing the films to the printing light through said openings sequentially, one of said openings being larger than the other, and means for rotating said shutter.

In testimony whereof I have signed my name to this specification in the presence of two subscribing witnesses.

HENRY RIEGEL EVANS.

Witnesses:
 HAROLD H. SIMMONS,
 RONALD S. DOLLEYMORE.